Oct. 8, 1963    B. I. SHAPIRO    3,106,092
APPARATUS FOR MEASURING TUBE VIBRATION
Filed Oct. 27, 1960
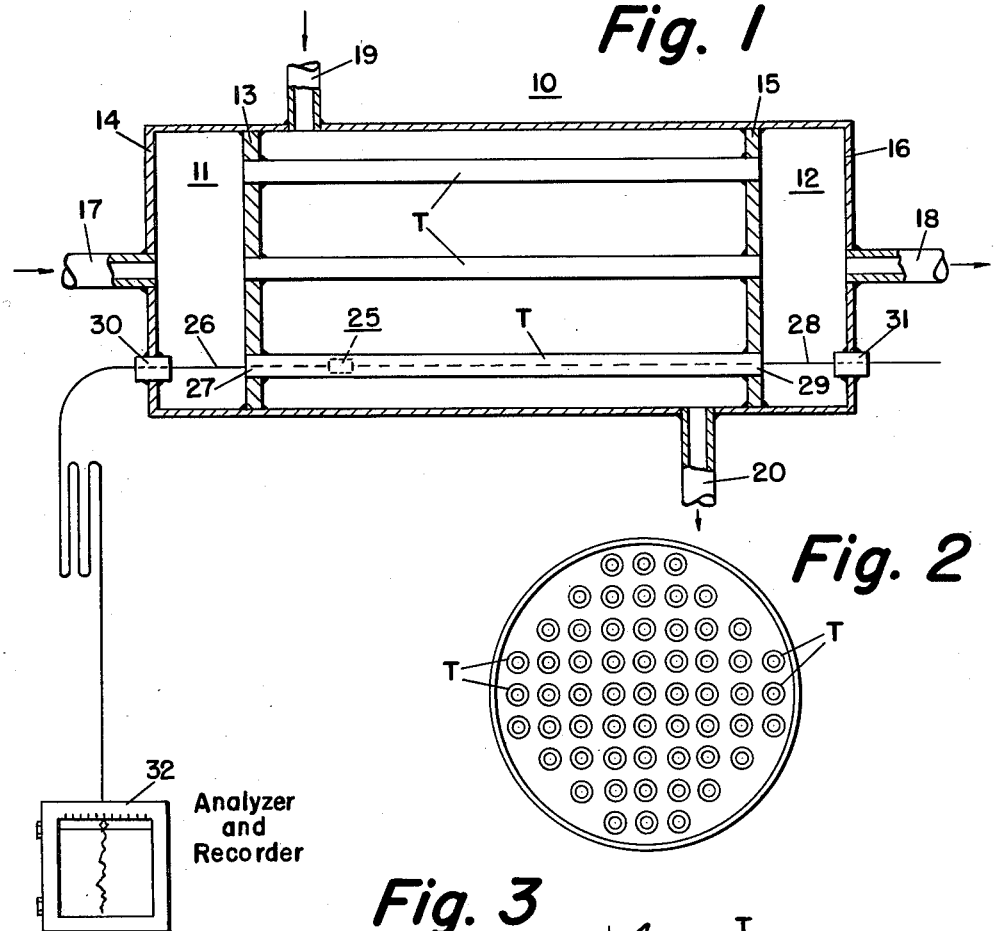
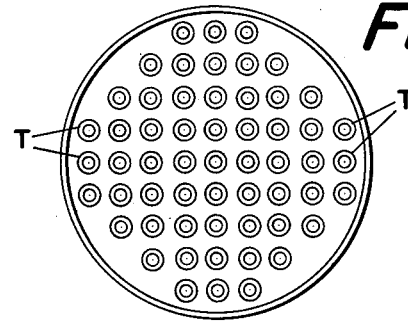
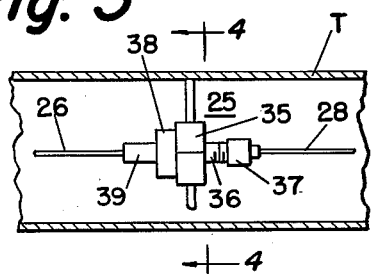
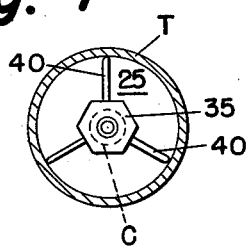
INVENTOR.
BERNARD I. SHAPIRO
BY
*J. R. Shehan*
ATTORNEY

United States Patent Office 3,106,092
Patented Oct. 8, 1963

3,106,092
APPARATUS FOR MEASURING TUBE VIBRATION
Bernard I. Shapiro, Philadelphia, Pa., assignor to the United States of America as represented by the Secretary of the Navy
Filed Oct. 27, 1960, Ser. No. 65,552
1 Claim. (Cl. 73—71.4)
(Granted under Title 35, U.S. Code (1952), sec. 266)

The invention described herein may be manufactured and used by or for the Government of the United States of America for governmental purposes without the payment of any royalties thereon or therefor.

This invention relates to vibration measuring and more particularly to measuring and recording the vibration of small diameter heat exchange tubes.

The possibility of failure of apparatus when it is subjected to an instantaneous or rapidly applied force in the nature of a shock or vibration is well known. Apparatus which is apt to be subject to vibration forces is frequently tested for its ability to stand up under operating conditions prior to being placed in actual use. Heretofore vibration testing has been accomplished by examining the exterior surface of a vibrating member under operating conditions, by the use of well known pick-up devices, but the known prior art has not been concerned with examining the interior surface of fluid conduits.

The broad object of this invention is directed to utilizing a vibration pick-up device for measuring the vibration of small diameter and closely spaced tubes of a heat exchange unit.

A further object of this invention is to provide for utilizing an electrical pick-up device for movement through a tube of a heat exchange unit while the unit is under operating conditions.

Another object is to provide an arrangement of a piezo-electrical accelerometer for movement through a tube of a heat exchange unit while the unit is under operating conditions for measuring the vibrations.

Another object is directed to a piezo-electrical accelerometer construction for measuring the vibration of small diameter and closely spaced heat exchange tubes.

The adaptation of heat exchangers, such as condensers for use with nuclear ship propulsion equipment, permits the heat transfer tubes to be of small diameter, generally of one-half inch or somewhat smaller, and the consequent use of small dimensioned heat exchangers. Since the nuclear propulsion equipment is intended to be used over extended periods without necessitating repair or replacement of parts, it is essential, when the equipment is initially installed, that all of the elements or component parts meet the requirements for the anticipated extended use.

The problem of measuring tube vibration in the heat exchangers of such equipment has been known for several years but no satisfactory answer has been found to accomplish this. The prior art of vibration measuring has been of practically no assistance in solving the problem for the general reason that vibration instruments or devices heretofore used have been fixedly mounted to the vibrating member for measuring the vibration. Additionally, the structure of the nuclear type heat exchange equipment is such that it is not practical to apply mechanical or electro-mechanical pick-up devices such as strain gauges, for example, to the exterior of the tubes to determine vibration since the tubes are assembled in such closely spaced relation and also for the reason that the heat exchange medium surrounding the tube would interfere with vibration indicators mounted on the exterior of the tubes.

It has been determined that accelerometers of the piezo-electric type which provide broad operational acceleration and frequency characteristics as well as high sensitivity and which are constructed in miniature form are suitable for carrying out this invention. Several such miniature accelerometers are commercially available and one such type is disclosed in this application and modified for carrying out the invention. The disclosed accelerometer has particular utility with this invention since it is comprised of a minimum of parts and is usable over a wide temperature range including the temperatures existing in nuclear condenser operation.

For a better understanding of the invention, reference should be made to the accompanying drawings, in which:

FIG. 1 is a view in longitudinal section of a heat exchanger unit with the invention applied thereto, the heat exchanger having only several tubes shown for the purpose of clarity.

FIG. 2 is a view in transverse section showing a general tube pattern of a condenser adapted for nuclear propulsion.

FIG. 3 is an enlarged view of a portion of FIG. 1 to show details.

FIG. 4 is a view on the line 4—4 of FIG. 3.

Referring to FIG. 1, the heat exchanger indicated at 10 is provided with end manifolds 11 and 12. The manifold 11 is formed by an inner tube sheet 13 and an end wall 14 and manifold 12 is formed by tube sheet 15 and an end wall 16. The manifold 11 is supplied with fluid through inlet 17 which passes through the tubes T to the other manifold 12 and out of the heat exchange unit 10 by outlet 18. When the heat exchanger is used as a condenser, steam from other equipment in the system with which the condenser is used will be supplied to the unit 10 through an inlet 19 and be distributed into the space between the tubes T and after heat exchange with the water in the tubes, the condensate will be exited through outlet 20.

In FIG. 2 is shown a transverse sectional view of the heat exchanger generally of the type of heat exchanger 10 and the figure is provided for the purpose of explaining the relative size and position of the tubes in a condenser used with nuclear reactor equipment. The tubes T of FIG. 2 will be of small diameter, for example, between ⅜″ and ½″ and be disposed parallel to the longitudinal axis, as shown in FIG. 1. Also the tubes will be closely spaced as between ⅛″ and ¼″ from each other and form a pattern generally like that shown in FIG. 2. It will be apparent that it would be practically impossible to measure vibration of a tube of the condenser by applying a vibration indicator to the exterior of a tube since the spacing between the tubes would be insufficient to accommodate a vibration indicator without interference from the outer surfaces of adjacent tubes.

Referring to FIG. 1, the lower tube T is provided with an accelerometer indicated at 25 and diagrammatically shown. The structure of the accelerometer will be described in more detail in connection with FIGS. 3 and 4. The accelerometer 25 is arranged to be moved between the open ends of the tube and for this purpose one cable 26 is secured to the accelerometer and has a portion extending through the end 27 of the tube while a second cable 28 is secured to the accelerometer and extends through the other end 29 of the tube. In order to manipulate the accelerometer or move it within the tube a sealed opening 30 is provided in the end wall 14 through which the end portion of the cable 26 extends and a sealed opening 31 is provided in the end wall 16 through which the cable 28 extends. In use, an operator or operators can manipulate the cables 26 and 28 to move the accelerometer or pick-up device 25 through a tube between its ends. One of the cables, for example, cable 26 is of conducting material for the purpose of transmitting signals from the accelerometer 25 to an instrument 32 where the signal is analyzed and recorded.

Referring to FIGS. 3 and 4, the accelerometer 25 of FIG. 1 is made up of a housing 35 which is hollow providing a compartment (not shown) for receiving a crystal element. The housing 35 is, as shown in FIG. 3, provided with an integrally formed screw-threaded connecting end portion 36 and in the use of this type accelerometer for this invention the connecting end portion 36 receives a connector 37 for securing the cable 28 thereto. A ring 38 is screw-threadedly mounted in the housing 35 and, in turn, receives a removable tubular screw-threaded connecting member 39. The ring 38 and member 39 maintain the crystal C, shown dotted in FIG. 4, in the housing and the screw-threaded member 39 provides an arrangement for receiving the conductor 26 and connecting it in a manner to transmit the signals from the crystal C. In order to transmit vibrations from the tube T, the housing 35 of the accelerometer is further modified by the provision of legs 40 which may be screw-threadedly mounted to the housing and are arranged to center the housing, as shown in FIG. 4, within the tube.

Since certain changes may be made in the above described construction and different embodiments of the invention may be made without departing from the scope thereof, it is intended that all matter contained in the above description or shown in the accompanying drawing shall be interpreted as illustrative and not in a limiting sense.

What is claimed is:

In combination, a heat exchange unit formed of a group of open end tubes disposed in parallel and secured in a pair of spaced apart tube sheets which provide therebetween a fluid chamber and form a fluid inlet manifold and a fluid outlet manifold with opposed end walls of the unit, with means for measuring tube variation under heat exchange operating conditions as heat exchange medium passes through the tubes between the inlet and the outlet manifolds, said means comprising a housing disposed within a tube and containing vibration pick-up means capable of developing an electrical output, said housing having a plurality of guide legs extending therefrom transversely of the longitudinal axis of the tube and contacting the inner wall of the tube at circumferentially spaced points to transmit vibrations to said pick-up means, an aperture in one end wall of the unit aligned generally with said tube, a cable providing an electrical conductor secured to the housing and extending through one open end of the tube and the aperture in the end wall, said aperture providing a seal to prevent leakage of heat exchange fluid but permitting manipulation of the cable for moving the housing through the tube and means exteriorly of the unit connected to said cable and operative by the electrical output of the pick-up means to record tube vibrations as the housing is moved therethrough.

References Cited in the file of this patent
UNITED STATES PATENTS

| | | |
|---|---|---|
| 2,281,960 | Vacquier | May 5, 1942 |
| 2,604,181 | Basham et al. | July 22, 1952 |